(12) United States Patent
Kawagishi et al.

(10) Patent No.: US 9,809,014 B2
(45) Date of Patent: Nov. 7, 2017

(54) RESIN JOINED BODY AND METHOD FOR MANUFACTURING SAME

(71) Applicant: NGK SPARK PLUG CO., LTD., Nagoya-shi, Aichi (JP)

(72) Inventors: Wataru Kawagishi, Nagoya (JP); Yusuke Fuji, Iwakura (JP); Takashi Koda, Nagoya (JP); Yoshihiko Kohmura, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 707 days.

(21) Appl. No.: 14/238,412

(22) PCT Filed: Sep. 27, 2012

(86) PCT No.: PCT/JP2012/074864
§ 371 (c)(1),
(2) Date: Feb. 11, 2014

(87) PCT Pub. No.: WO2013/047645
PCT Pub. Date: Apr. 4, 2013

(65) Prior Publication Data
US 2014/0255668 A1  Sep. 11, 2014

(30) Foreign Application Priority Data
Sep. 29, 2011 (JP) .................................. 2011-215561

(51) Int. Cl.
*B32B 37/00* (2006.01)
*B29C 65/16* (2006.01)
(Continued)

(52) U.S. Cl.
CPC ...... *B32B 37/0076* (2013.01); *B29C 65/1635* (2013.01); *B29C 65/1654* (2013.01);
(Continued)

(58) Field of Classification Search
None
See application file for complete search history.

(56) References Cited

U.S. PATENT DOCUMENTS

2008/0187697 A1*  8/2008  Amano ............... B29C 65/1635
428/35.7
2011/0200802 A1*  8/2011  Li ........................ B29C 65/8253
428/198

FOREIGN PATENT DOCUMENTS

JP  2001-246488 A  9/2001
JP  2005-231308 A  9/2005
(Continued)

OTHER PUBLICATIONS

Machine Translation of JP 2005-231308 published 2005.*
(Continued)

*Primary Examiner* — Gerard Higgins
*Assistant Examiner* — Sathavaram I Reddy
(74) *Attorney, Agent, or Firm* — Sughrue Mion, PLLC (57) ABSTRACT

A method for producing a resin joined body in which a specific region L1 of a welding portion of a second resin member (21) is provided to form a low-laser-light-transmissible portion, and the low-laser-light-transmissible portion has a laser light transmissibility lower than that of a region of the welding portion other than the specific region L1. Welding is carried out so that a portion between points S2 and F2, serving as a weld overlap portion (112), is present in the specific region L1 forming the low-laser-light-transmissible portion. Also disclosed is a resin joined body.

7 Claims, 7 Drawing Sheets (51) Int. Cl.
    *B29C 65/82*     (2006.01)
    *B29C 65/00*     (2006.01)
    *B32B 7/04*     (2006.01)
    *B29C 65/78*     (2006.01)

(52) U.S. Cl.
CPC ...... *B29C 65/1658* (2013.01); *B29C 65/7817* (2013.01); *B29C 65/8253* (2013.01); *B29C 66/112* (2013.01); *B29C 66/131* (2013.01); *B29C 66/24244* (2013.01); *B29C 66/3472* (2013.01); *B29C 66/53461* (2013.01); *B29C 66/721* (2013.01); *B29C 66/733* (2013.01); *B29C 66/73161* (2013.01); *B29C 66/73921* (2013.01); *B29C 66/836* (2013.01); *B32B 7/045* (2013.01); *B29C 65/1677* (2013.01); *B29C 65/1696* (2013.01); *B29C 66/71* (2013.01); *B29C 66/7212* (2013.01); *B29C 66/7332* (2013.01); *B29C 66/7336* (2013.01); *B29C 66/73115* (2013.01); *B29C 66/872* (2013.01); *Y10T 428/24851* (2015.01)

(56) References Cited

FOREIGN PATENT DOCUMENTS

| JP | 2005-246692 A | 9/2005 |
| JP | 2008-272955 A | 11/2008 |
| JP | 2011-255575 A | 12/2011 |

OTHER PUBLICATIONS

Communication dated Sep. 16, 2015 from the Korean Intellectual Property Office in counterpart application No. 10-2014-7009916.
International Search Report for PCT/JP2012/074864 dated Dec. 25, 2012.

\* cited by examiner

RESIN JOINED BODY AND METHOD FOR MANUFACTURING SAME

CROSS REFERENCE TO RELATED APPLICATIONS

This is a National Stage of International Application No. PCT/JP2012/074864 filed Sep. 27, 2012, claiming priority based on Japanese Patent Application No. 2011-215561 filed Sep. 29, 2011, the contents of all of which are incorporated herein by reference in their entirety.

TECHNICAL FIELD

The present invention relates to a method for producing a resin joined body. More particularly, the present invention relates to a resin joined body produced by bringing a resin member formed of a thermoplastic resin which absorbs laser light (hereinafter the resin may be referred to as an "absorbable thermoplastic resin" or a "light-absorbing resin") (hereinafter the resin member may be referred to as a "first resin member") into contact with a resin member formed of a thermoplastic resin which transmits laser light (hereinafter the resin may be referred to as a "transmissible thermoplastic resin" or a "light-transmitting resin") (hereinafter the resin member may be referred to as a "second resin member"), and by irradiating the second resin member with laser light, to thereby weld the members together through heating and melting of the contact interface between the members; and to a method for producing the resin joined body.

BACKGROUND ART

There is a case where a first resin member (e.g., a rectangular parallelepiped box-shaped casing main body which is formed of a thermoplastic resin such as nylon, which has a rectangular shape in plan view, and which is open above) is intended to be sealed with a second resin member (i.e., a cover (lid) which is formed of, for example, nylon and which has a rectangular flat portion having a uniform thickness) so as to close the opening of the first resin member, by means of laser welding (hereinafter may be referred to simply as "welding") of the peripheral surface (on the opening side) of the casing main body (i.e., the upper end surface of the side wall (vertical wall) along the opening) and the peripheral edge surface (the peripheral-end-side surface) of the cover which abuts the peripheral surface of the casing main body. The aforementioned case corresponds to, for example, a case where the thus-produced casing is employed for a controller including therein a control circuit board for an in-vehicle electric component (e.g., a glow plug or a gas sensor). In such a case, while an appropriate surface pressure is applied, by means of a jig or a similar apparatus, to the contact interface between the resin members to be welded, a laser (e.g., a semiconductor laser) head is positioned at a specific position (start point) of a portion to be welded (hereinafter such a portion may be referred to as a "welding portion") on the outside of the cover (on the side opposite the bonding surface). Then, while the cover is irradiated with laser light, the laser head is circumferentially moved along the opening, to thereby carry out laser welding along a specific line (Patent Document 1). In the case of such laser welding, the laser light transmitting through the second resin member heats and melts a bonding interface portion of the first resin member (absorbable thermoplastic resin), the portion being in contact with the second resin member (transmissible thermoplastic resin), and the thus-generated heat melts the corresponding bonding interface portion of the second resin member, whereby the bonding interface portions are welded; i.e., the circumferential portions of the resin members are welded in association with movement of the laser head.

For reliable sealing of the opening of the casing main body through such laser welding, the end point of movement (circumferential movement along the (rectangular) opening) of the laser head (i.e., end point of laser irradiation (welding end position)) must fall beyond the start point thereof (i.e., start point of laser irradiation (welding start position)) by an appropriate length (e.g., 2 to 3 mm), in order to prevent occurrence of a very small unwelded portion, which would otherwise occur between the start point and the end point when the end point does not fall beyond the start point. Thus, when laser welding is carried out as described above, a portion between the start point and the end point (having a specific length (e.g., 2 to 3 mm)) is subjected to the laser irradiation process twice; i.e., the portion is subjected to the welding process twice (hereinafter the portion may be referred to as a "weld overlap portion").

In the welded portions of the resin members—which are bonded together through heating and melting in association with movement of the laser head in the aforementioned welding process—expansion occurs due to heating, and then shrinkage (sink) occurs in a cooling/solidification process. When each of the resin members to be welded is an integrally molded resin product, welding portions of the resin member basically exhibit uniform laser light transmissibility or absorbability, or there is virtually no difference in laser light transmissibility or absorbability between the welding portions. Therefore, in the aforementioned welding process, basically, while laser light is radiated at constant laser output, the laser head is moved (scanned) at constant speed, in order to secure uniform bonding strength (fixing strength) or sealing performance in the entire welding portions by means of uniform welding.

PRIOR ART DOCUMENT

Patent Document

Patent Document 1: Japanese Patent Application Laid-Open (kokai) No. 2005-246692

SUMMARY OF THE INVENTION

Problems to be Solved by the Invention

In the case where welding is carried out at constant laser output, speed, etc. as described above, generally uniform sealing performance or fixing strength is achieved in a welded portion which has been subjected to the welding process only once (i.e., other than a weld overlap portion). However, the welding state of a weld overlap portion (which has been subjected to the welding process twice) differs from that of a welded portion which has been subjected to the welding process only once. Specifically, unlike the case of a portion welded through a single laser irradiation process, such a weld overlap portion (hereinafter may be referred to simply as an "overlap portion") is subjected to a repeated heating, melting, and cooling/solidification process, which may cause entry of gas or air into the overlap portion. Thus, voids may be generated in the welding surface of the overlap portion, or sink may occur therein due to repeated cooling and shrinkage. That is, the welding state of the weld overlap portion differs from that of another portion, which may cause problems in terms of locally reduced bonding strength (welding strength) and unreliable sealing performance.

Conceivable means for solving such a problem is to control laser irradiation conditions; for example, only a weld overlap portion is irradiated with laser light of lower laser output, or a laser head is moved on the weld overlap portion at higher speed. However, such means may cause considerable practical problems in production of a resin joined body (hereinafter may be referred to simply as a "joined body"); for example, requirement of complicated control, and reduction of production efficiency.

An object of the present invention is to provide a method for producing a resin joined body, which method can solve, without controlling laser irradiation conditions (e.g., laser output and the movement speed of a laser head), the aforementioned problems involved in a resin joined body production method wherein a first resin member and a second resin member which are stacked with each other are welded together by carrying out laser welding along a line on a specific portion (welding portion); i.e., problems involved in that the end point of laser welding (movement of a laser head) falls beyond the start point thereof, and the resultant resin joined body has a weld overlap portion (i.e., a welded portion between these two points, which has been subjected to a laser irradiation process one more time than has another welded portion). Another object of the present invention is to provide a resin joined body produced through the method.

Means for Solving the Problems

In order to solve the aforementioned problems, the present invention as described in claim 1 provides a method for producing a resin joined body, the method comprising bringing a first resin member having laser light absorbability into contact with a second resin member having laser light transmissibility; and irradiating the second resin member with laser light, so as to carry out welding along a line; and the resin joined body having a weld overlap portion, which corresponds to a welded portion between the start point of welding and the end point of welding, and which is formed by carrying out a welding process one more time than for another welded portion so that the end point of welding is located at a specific position falling beyond the start point of welding, the method being characterized in that:

a specific region of a welding portion of the second resin member is formed as a portion having low laser light transmissibility (hereinafter may be referred to as a "low-laser-light-transmissible portion"), the low-laser-light-transmissible portion having laser light transmissibility lower than that of a region of the welding portion other than the specific region; and the first resin member and the second resin member are welded together so that the weld overlap portion is present in the specific region forming the low-laser-light-transmissible portion.

The invention as described in claim 2 provides a method for producing a resin joined body according to claim 1, wherein the first resin member and the second resin member are welded together so that the weld overlap portion is present almost entirely within the specific region forming the low-laser-light-transmissible portion.

The invention as described in claim 3 provides a method for producing a resin joined body according to claim 1 or 2, wherein the second resin member contains reinforcing fiber and is formed through injection molding.

The invention as described in claim 4 provides a method for producing a resin joined body according to claim 1 or 2, wherein the specific region forming the low-laser-light-transmissible portion of the second resin member is formed so as to be thicker than a region of the welding portion other than the specific region, and to protrude on the side toward a laser light incident surface.

The invention as described in claim 5 provides a method for producing a resin joined body according to claim 1 or 2, wherein the specific region forming the low-laser-light-transmissible portion of the second resin member has a laser light incident surface which is rougher than that of a region of the welding portion other than the specific region.

The invention as described in claim 6 provides a method for producing a resin joined body according to any one of claims 1 to 5, wherein the second resin member has an externally visible positioning mark which is employed when the second resin member is brought into contact with and positioned against the first resin member.

The present invention as described in claim 7 provides a resin joined body produced by bringing a first resin member having laser light absorbability into contact with a second resin member having laser light transmissibility, and irradiating the second resin member with laser light, so as to carry out welding along a line, the resin joined body having:

a weld overlap portion, which corresponds to a welded portion between the start point of welding and the end point of welding, and which is formed by carrying out a welding process one more than for another welded portion so that the end point of welding is located at a specific position falling beyond the start point of welding, the resin joined body being characterized in that:

a specific region of a welding portion of the second resin member is formed as a low-laser-light-transmissible portion, the low-laser-light-transmissible portion having laser light transmissibility lower than that of a region of the welding portion other than the specific region; and the weld overlap portion is present in the specific region forming the low-laser-light-transmissible portion.

In the present invention, the difference in light transmissibility between the low-laser-light-transmissible portion (the aforementioned specific region) and another portion (i.e., the degree of laser light transmissibility of the low-laser-light-transmissible portion)—which may vary with welding conditions (e.g., laser output, the movement speed of a laser head, and the thickness of a resin member to be welded)—may be basically determined in consideration of the intended use of a resin joined body, so that a weld overlap portion (which has been subjected to the welding process more than has another portion) exhibits bonding strength and sealing performance comparable to those of said another portion, or voids or abnormal shrinkage does not occur in the weld overlap portion. In the case of a resin joined body produced by carrying out a welding process once, the weld overlap portion thereof is subjected to the welding process twice. In such a case, preferably, the light transmissibility of the low-laser-light-transmissible portion (hereinafter may be referred to as a "low-transmissible portion") is adjusted to be lower by 5% or more (particularly 5 to 10%) than that of another portion.

Effects of the Invention

In the case where a resin joined body is produced by carrying a welding process once (one cycle) along a designed line, a weld overlap portion thereof is subjected to the welding process twice (i.e., a specific welding portion is welded repeatedly). According to the present invention, which has the aforementioned configuration, the weld overlap portion which is subjected to the welding process twice is present in a portion exhibiting relatively low laser light transmissibility. Therefore, since the degree of heating or melting of the first resin member through a single laser irradiation process of the weld overlap portion can be reduced, even when the weld overlap portion is subjected to the laser irradiation process twice, the degree of heating or melting of the first resin member at the weld overlap portion can be reduced, as compared with conventional cases; i.e., the case where the welding portion of the second resin member exhibits uniform laser light transmissibility. That is, unlike the case where a weld overlap portion is formed in a region exhibiting uniform laser light transmissibility, in the present invention, the weld overlap portion is formed in the low-laser-light-transmissible portion. Therefore, even when the weld overlap portion is welded through repeated heating and melting, the degree or risk of entry of gas or air into the overlap portion, which would otherwise be caused by, for example, shrinkage during a cooling/solidification process after the repeated heating, can be reduced. Thus, in the present invention, occurrence of voids in the weld overlap portion can be suppressed, as can occurrence of sink resulting from repeated shrinkage, as compared with conventional cases. Therefore, the present invention exhibits the effect of preventing local reduction in bonding strength and deterioration of sealing performance, as compared with conventional cases.

The low-transmissible portion may include therein a portion having the lowest (bottom peak) transmissibility at a part of the aforementioned specific region. That is, in the specific region, for example, the transmissibility may change (may gradually increase) from a middle part (corresponding to the portion of lowest transmissibility) toward one end and the other end of the specific region. Alternatively, the low-transmissible portion may exhibit a transmissibility which is lower than that of another portion but is almost uniform within the specific region (i.e., the low-transmissible portion may exhibit a transmissibility which is uniformly lower than that of another portion). In the former case, welding is preferably carried out so that the portion of lowest transmissibility is present in the aforementioned weld overlap portion. Meanwhile, in the latter case, from the viewpoint of design, welding is preferably carried out so that the weld overlap portion is present almost entirely within the specific region forming the low-laser-light-transmissible portion as described in claim 2. In consideration of production errors, the weld overlap portion may be present so as to exceed the ends of the specific range, or may be present within the specific range. However, if possible, welding must be carried out so that the weld overlap portion is present entirely within the specific region.

In the case where, as described in claim 3, the second resin member contains reinforcing fiber (e.g., reinforcing fiber such as glass fiber) and is formed through injection molding, there is a tendency that, in a local portion of the second resin member located in the vicinity of a gate (i.e., an inlet adjacent to a cavity for injection of a heated raw material resin) of a mold employed for molding of the resin member, the orientation of the aforementioned reinforcing fiber contained in the member becomes complicated during production, as compared with another portion. Thus, generally, the portion of the second resin member located in the vicinity of the gate exhibits relatively low transmissibility. Therefore, in the case where the second resin member contains reinforcing fiber and is formed through injection molding, when a single gate is provided on the mold employed for molding, the aforementioned low-transmissible portion can be automatically formed in a region located in the vicinity of the gate. That is, the low-transmissible portion can be formed without any special means.

As described in claim 4, the thickness of the specific region is increased for achieving reduction in laser light transmissibility. When the thickness is increased by forming a protrusion on the side toward the incident surface (front surface), the flatness of the bonding surface is not impaired. Meanwhile, as described in claim 5, transmissibility may be reduced by roughening the laser light incident surface, to thereby inhibit straight propagation of radiated laser light or to scatter the laser light. Such surface roughening exhibits the effect of allowing the low-transmissible portion to be located at an appropriate position. As used herein, the term "incident surface" refers to a surface irradiated with laser light (i.e., a surface on the side nearer a laser light source). Another means for reducing laser light transmissibility may be coloring of the incident surface with, for example, a dye which inhibits transmissibility.

The production process (welding process) of the resin joined body requires a step of integrating the first resin member and the second resin member together (e.g., placement of the first resin member on the second resin member). In this case, positioning of these members is required. In some cases, the position of the low-transmissible portion of the second resin member, which may vary with the shape or structure of each resin member, cannot be clearly determined by a production worker or a handling apparatus. Therefore, as described in claim 6, the second resin member is preferably provided with an externally visible positioning mark which is employed when the second resin member is brought into contact with and positioned against the first resin member. This is because the low-transmissible portion of the second resin member can be readily recognized on the basis of this mark. By virtue of this mark, the low-transmissible portion of the second resin member—whose position would otherwise be difficult to determine and which may otherwise be incorrectly positioned in the presence of such a mark—can be readily positioned.

According to the resin joined body of the present invention as described in claim 7, since the weld overlap portion is formed in the low-laser-light-transmissible portion, generation of voids in the weld overlap portion is suppressed, and occurrence of sink caused by repeated shrinkage is reduced, as compared with the case of a conventional resin joined body. Thus, in the resin joined body of the present invention, there can be prevented local reduction in bonding strength and deterioration of sealing performance, as compared with conventional cases.

BRIEF DESCRIPTION OF THE DRAWINGS

FIG. 5A is a vertical cross-sectional view for description of the state of measurement, and FIG. 5B is a plan view thereof.

MODES FOR CARRYING OUT THE INVENTION

First Embodiment

Figure 1:
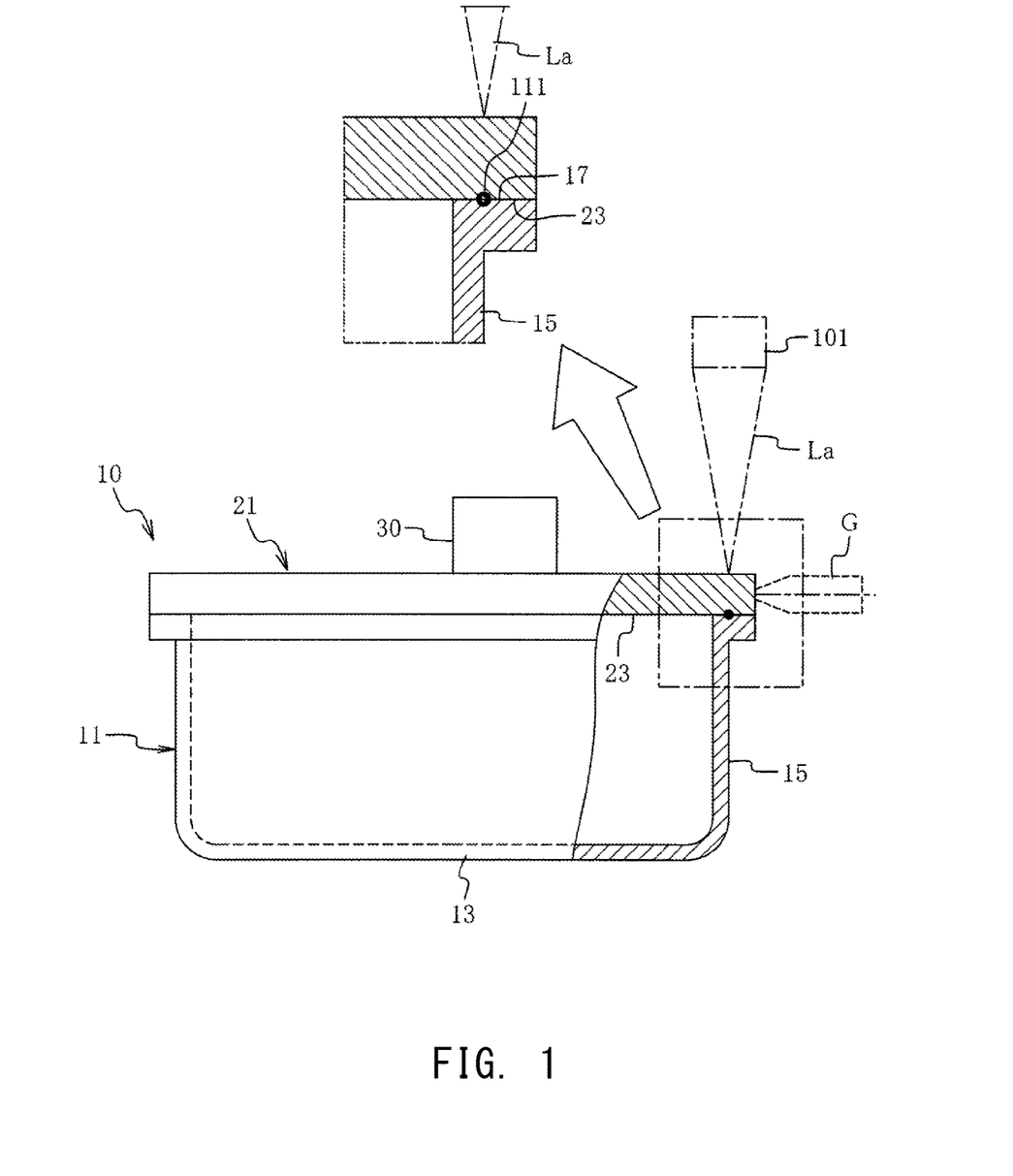
FIG. 1 is an exploded cross-sectional view of a resin joined body produced in a specific embodiment (first embodiment) of the present invention, as well as an enlarged view of a main portion of the resin joined body.

The first embodiment (i.e., a specific embodiment of the present invention) will be described in detail with reference to FIGS. 1 to 3. As shown in FIG. 1, a resin joined body 10 produced in the first embodiment includes a casing main body 11 (first resin member 11) which has laser light absorbability, which has a generally rectangular shape in plan view, and which is open above; and a flat-plate-like lid 21 (second resin member 21) which has laser light transmissibility, and which has a generally rectangular shape in plan view, wherein the second resin member is provided so as to close the opening of the first resin member. Specifically, the first embodiment will be described by taking the case where the lid 21 is positioned so that a peripheral-end-side surface (back surface) 23 thereof abuts an upper end surface 17 of a side wall 15 rising from the peripheral edge of a bottom plate 13 of the casing main body (first resin member) 11, and then, as shown in FIG. 2, laser welding is circumferentially carried out at the abutting surfaces along the peripheral edge of the lid 21 (the opening of the casing main body 11) (shown by a dotted line 111), to thereby produce the joined body 10 through sealing of the abutting surfaces.

In the first embodiment, each of the casing main body (first resin member) 11 and the lid (second resin member) 21 is formed through injection molding of a raw material resin (nylon) containing glass fiber (reinforcing fiber). As shown in FIG. 2, a runner G (shown by a broken line in FIG. 2) corresponding to a gate of a molding die is located at a middle position P1 of the lid 21, the middle position P1 being located on a short side surface on the right side (in plan view) of FIG. 2. Therefore, in the first embodiment, a specific region (broken-line hatched area) L1 of the lid 21, which includes the middle position P1 located on one short side of the peripheral-end-side portion (in plan view) of the lid 21, is formed as a low-laser-light-transmissible portion which exhibits laser light transmissibility (light transmissibility or translucency) lower than that of another portion. The transmissibility of the specific region (broken-line hatched area) L1 is lower by 5 to 10% than that of another region (i.e., other than the broken-line hatched area). In the first embodiment, the transmissibility (translucency) is lowest at the middle position P1 within the specific region L1, and the transmissibility increases from the position P1 (along the short side) toward the ends S1 and F1 of the specific region L1. The transmissibility at each of the ends S1 and F1 is equal (almost equal) to that of another portion. In the first embodiment, a protrusion 30 is formed on the outer surface (front surface) of the lid (second resin member) 21 and in the vicinity of the short side on the right side of FIG. 2 (i.e., on the side toward the specific region L1 forming the low-laser-light-transmissible portion), and the protrusion 30 serves as a mark representing the short side having the low-laser-light-transmissible portion.

Figure 2:
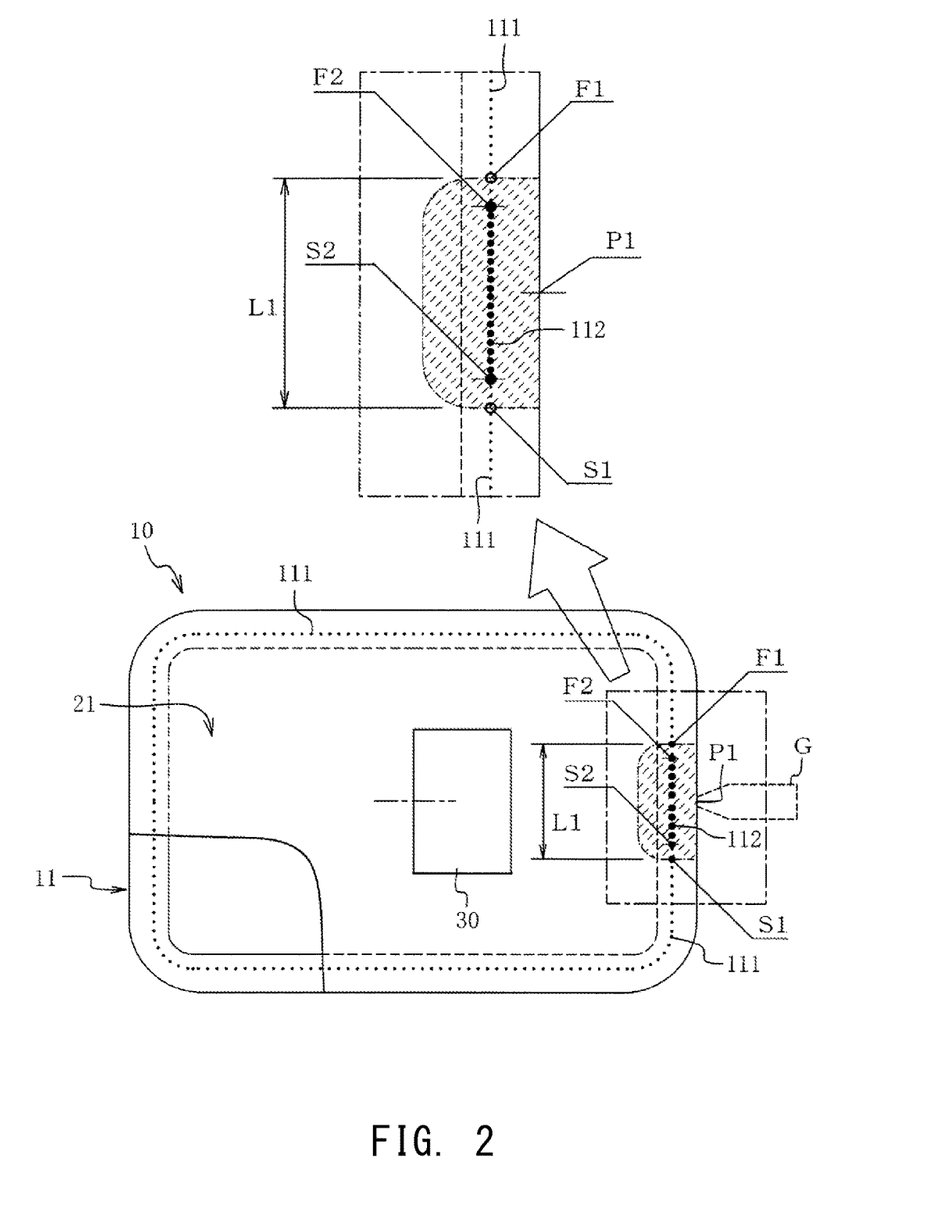
FIG. 2 is a plan view of the resin joined body of FIG. 1, as well as an enlarged view of a main portion of the resin joined body.
Figure 3:
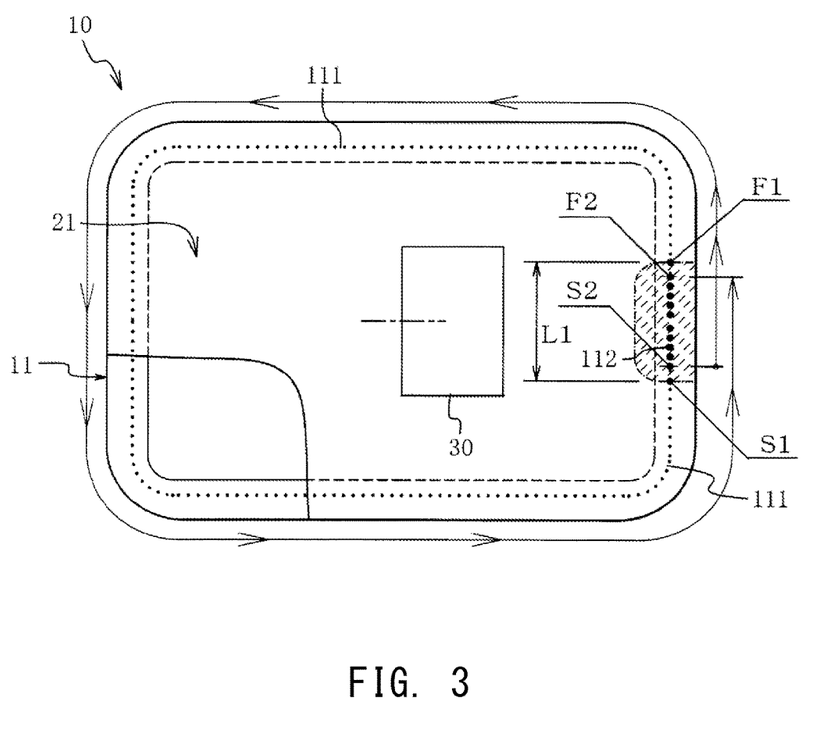
FIG. 3 is a plan view of the resin joined body of FIG. 1, which illustrates welding (from start to end) of the resin joined body.

In the first embodiment, the lid 21 (second resin member) is positioned against the casing main body 11 (first resin member) by placing the lid 21 on the casing main body 11 so that the protrusion 30 (serving as a mark) on the front surface of the lid 21 is located on the right side of FIG. 2. The thus-positioned resin members 11 and 21 are clamped by non-illustrated fixation member (jig), or a weight is placed on the members 11 and 21, so that an appropriate pressure is applied between the bonding surfaces of the members, and then the members are positioned at a specific position on a specific stage (table) attached to a non-illustrated laser welding apparatus. Then, a laser irradiation head 101 which is provided (as shown in FIG. 1) so as to radiate laser light La to the outside of the lid 21 (second resin member) is positioned so that, for example, the point S2 in the vicinity of one end S1 of the specific region L1 shown in FIG. 2 becomes the start point. Then, while the laser light La is radiated at constant output, the laser irradiation head 101 is circumferentially moved once (i.e., from the start point S2 to the point S2) at constant speed in a counterclockwise direction along the arrow (around the periphery of the lid 21) shown in FIG. 3, and is further moved so as to fall beyond the point S2 toward the point F2 (end point) in the vicinity of the other end F1 of the specific region L1. Specifically, in the first embodiment, welding is carried out along a specific line on the circumference of the lid 21; i.e., along the opening of the casing main body 11 between the lid 21 and the upper end surface 17 of the side wall 15 of the casing main body 11, so that the weld overlap portion corresponds not to the entire specific region (low-laser-light-transmissible portion) L1 (i.e., between the points S1 and F1), but to a shorter region between the points S2 and F2 of the welding portion. The dotted line shown in FIG. 2 or 3 represents a line-form welding portion 111, and a thick portion of the dotted line (i.e., between the points S2 and F2) corresponds to the weld overlap portion 112 in the first embodiment.

Thus, in the first embodiment, the welding portion 111 having a specific width (exclusive of the region between the points S2 and F2 of the specific region (low-laser-light-transmissible portion) L1) is subjected to welding once along a line on the circumference of the lid 21. Meanwhile, the region between the point S2 (start point) and the point F2 (end point) of the specific region (low-laser-light-transmissible portion) L1 is subjected to welding twice along the same line; i.e., the region between the points S2 and F2 corresponds to the weld overlap portion 112. Preferably, the weld overlap portion 112 corresponds to the entire length of the specific region L1 (including the point S1 (start point) and the point F1 (end point)); i.e., the weld overlap portion 112 is present between the point S1 and the point F1. However, in the first embodiment, the weld overlap portion 112 is provided such that the length thereof is shorter than the entire length of the specific region L1, since the transmissibility increases from the point P1 toward the point S1 or F1, and the transmissibility at the point S1 or F1 is equal to that of another portion. In consideration of errors, etc., the start point or the end point may be located outside the specific region L1, so long as the distance between the specific region and the start point or the end point is very small. This may be determined in consideration of the degree of low transmissibility so that the laser light La transmitting through the second resin member 21 in the first cycle of welding heats the first resin member 11 to a melting temperature at the interface where the second resin member 21 abuts the first resin member 11, to thereby heat and melt the second resin member 21 at the interface for welding of a specific width, and the low-laser-light-transmissible portion is appropriately welded in the second cycle of welding. In the first embodiment, the specific region L1 is formed as the low-laser-light-transmissible portion having transmissibility lower by 5 to 10% than that of another portion, and the weld overlap portion 112 in the region L1 is appropriately welded by irradiating the portion 112 with the laser light La twice.

That is, in the first embodiment, a portion other than the specific region L1 is appropriately welded by irradiating the portion with the laser light La once. Meanwhile, since the specific region L1 is formed as the low-laser-light-transmissible portion having laser light transmissibility lower by 5 to 10% than that of another portion, even when the weld overlap portion 112 present in the specific region L1 is irradiated with the laser light La twice, the degree of welding of the weld overlap portion 112 is lower than that of another portion after the first cycle of welding, and thus generation of gas or shrinkage is suppressed in the weld overlap portion 112. In this case, since the weld overlap portion 112 is subjected to welding twice, the welded portion is reinforced through repeated melting and cooling/solidification. However, since the degree of welding of the weld overlap portion 112 is low as in the case of the first cycle of welding, generation of gas or shrinkage is suppressed in the weld overlap portion 112. Thus, according to the production method of the first embodiment, the intensity of the laser light La which is received and absorbed by the first resin member 11 is controlled not by changing laser output, but by reducing the transmissibility of the laser light transmitting through the second resin member 21 at the weld overlap portion 112. Therefore, the degree of welding or cooling/solidification at the weld overlap portion 112 can be controlled without regulating, for example, laser output or the speed of the circumferentially moved laser head. Thus, according to this production method, reduction in bonding strength or sealing performance of the overlap portion can be suppressed even when the laser light is radiated at constant laser output and the laser head is moved at constant speed, as compared with the case of a conventional overlap portion, which is formed by performing welding twice without provision of a low-transmissible portion.

Furthermore, in the first embodiment, since the second resin member 21 contains reinforcing fiber and is formed through injection molding as described above, the low-transmissible portion is formed only through setting of the position of a gate during molding; i.e., the low-transmissible portion can be formed very efficiently. Therefore, this method exhibits a remarkable effect in terms of productivity, from the viewpoint that high cost is not required for formation of the low-transmissible portion.

In the first embodiment, the lid 21 which correspond to the second resin member 21 has a rectangular shape. However, since, as described above, the lid 21 has on the front surface thereof the protrusion 30 serving as a positioning mark, a positioning error can be prevented when the lid 21 is placed on the casing main body (first resin member) 11, and thus occurrence of repositioning can be effectively prevented. Movement of the laser head 101 for radiation of the laser light La is set and controlled in advance so that the head is moved along a welding line of the resin joined body 10 to be produced. Specifically, as described above, the laser head 101 is controlled so as to circumferentially move from a specific position (e.g., the start point S2 in the specific region L1 in the aforementioned case) through the point S2 to the end point F2, after placement and positioning of the second resin member 21 on the first resin member 11 positioned on a specific stage (table) of a laser welding apparatus, and subsequent clamping of these members by an appropriate fixation means (jig). Therefore, in the case where, as described above, the second resin member 21 has a rectangular shape, and the low-laser-light-transmissible portion is provided along one short side of the member, when the second resin member 21 is positioned and welded while the position of the low-transmissible portion is incorrectly recognized (i.e., the low-transmissible portion is regarded as being positioned at the other short side) by a worker, there may arise a welding problem in that the entirety of the weld overlap portion 112 is formed in a region other than the low-laser-light-transmissible portion.

However, according to the first embodiment, since the mark (protrusion 30) is provided on the second resin member 21, incorrect positioning thereof against the first resin member 11 can be readily prevented; i.e., the aforementioned welding problem can be readily avoided even when welding is carried out by an unskilled worker. No particular limitation is imposed on the mark, so long as it is an externally visible mark; for example, a mark having a structural feature, such as protrusion or dent (incuse), a colored mark, or a graphical mark. Provision of such a mark is particularly preferred for preventing of welding problems, when the second resin member 21 has a line-symmetric shape or a shape similar thereto in plan view (e.g., a rectangular shape as in the aforementioned case, a regular polygonal shape, or a circular shape), and thus the position of the specific region is not readily determined.

The laser light La transmissibility of the specific region (low-transmissible portion) including the weld overlap portion 112 of the second resin member 21 may appropriately determined on the basis of, for example, laser light wavelength, output, and the movement speed of a laser head (mm/sec) through repeated trials, so as to achieve desired welding (e.g., welding width) along with another welding portion. Specifically, the laser light transmissibility should be determined in consideration of, for example, the material of the resin or the welding width for the resin joined body 10, so as to achieve the bonding strength, sealing performance, etc. required for the entire welded portion including the weld overlap portion 112. As described above, the weld overlap portion 112 may be present entirely within the aforementioned specific region forming the low-laser-light-transmissible portion. Alternatively, the weld overlap portion 112 may be provided in the specific region L1 so as to shorter than the entire length of the specific region L1, or may be provided so as to fall beyond one end or both ends of the specific region L1 to a very small extent, so long as no problems arise in the overlap portion in terms of bonding strength or sealing performance. The first embodiment corresponds to the case where the transmissibility of the low-transmissible portion increases toward both ends of the specific region. Therefore, when a change in transmissibility is large, no particular limitation is imposed on the overlap portion, so long as each end thereof steps over a portion of lowest transmissibility.

Regarding the resin joined body produced in the aforementioned first embodiment (FIGS. 1 to 3), the second resin member (lid 21) having laser light transmissibility was separated from the first resin member (casing main body 11) having laser light absorbability at the welding surface (interface) between the members, and the laser light transmissibility (translucency) in thickness direction was measured at the specific region forming the low-transmissible portion (broken-line hatched area) L1 and another welded portion. For measurement of the laser light transmissibility, a sample cut out of each portion was irradiated with laser light of specific output, and the attenuated output of laser light transmitted through the sample was measured by means of a power meter. The percent output (%) of laser light for each sample was calculated on the basis of the output of non-transmitted laser light (taken as 100). The thus-calculated value was regarded as transmissibility (%), and the data of samples were compared.

(Preparation of Sample)

Figure 4:
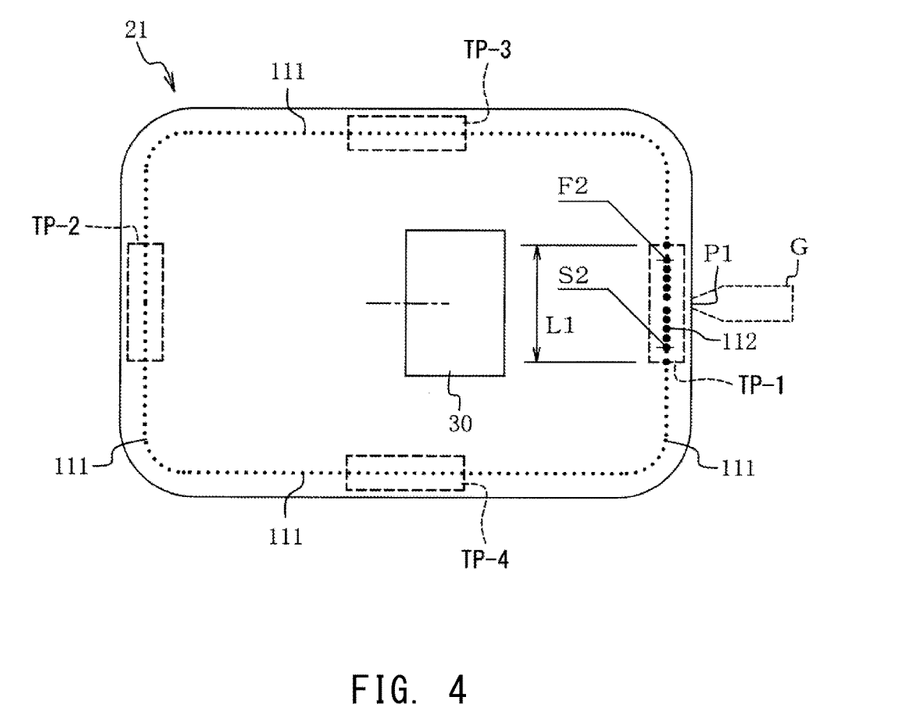
FIG. 4 is a plan view of the resin joined body produced in the first embodiment, which illustrates portions (samples for measurement of laser light transmissibility) cut out of a second resin member (lid) separated from a first resin member (casing main body) at the welding surface (interface) between the members.

A sample employed for the aforementioned measurement was prepared as follows. As shown by the broken lines in FIG. 4, four rectangular sample pieces (TP-1, TP-2, TP-3, and TP-4), each having a uniform length (L1) and a uniform width including a welding line (welding portion 111), were cut out of the above-separated second resin member (lid 21) at middle portions along four sides thereof, the second resin member having a rectangular shape in plan view. Among these sample pieces, the sample piece TP-1 corresponds to the weld overlap portion 112; i.e., the low-laser-light-transmissible portion. For preparation of a sample having a uniform thickness, the welding surface of the corresponding piece was subjected to cutting and polishing (grinding) to a specific extent (corresponding to a thickness larger than the largest depth of a welding trace in the entire sample: 0.2 mm) so as to remove a welding trace including a portion melted during welding. Thus, each of the samples TP-1 to TP-4 corresponds to a portion having a uniform thickness remaining after removal of the welding trace.

(Preparation of Measurement)

Figure 5:
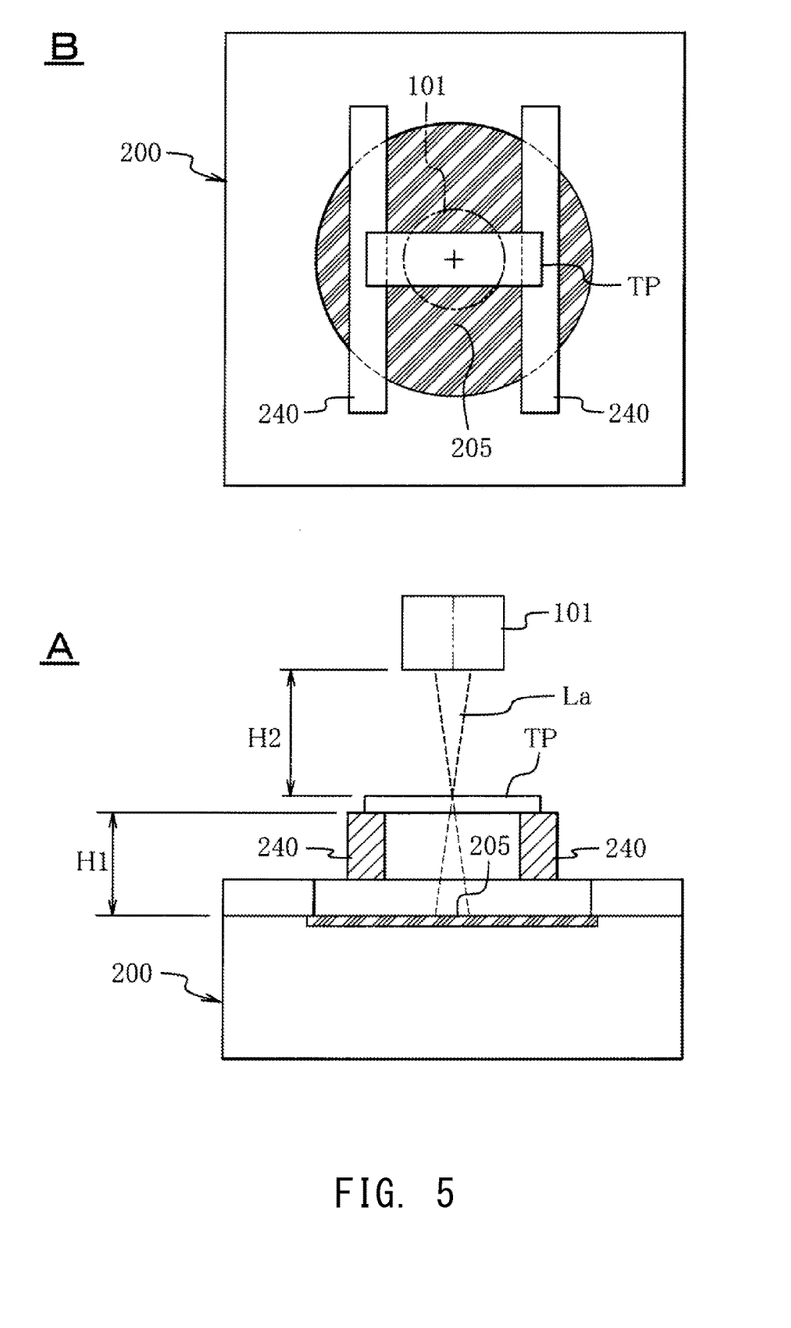
FIG. 5 schematically shows measurement of laser light transmissibility by means of a power meter.

As shown in FIG. 5, elongated block pieces (jig) 240 for supporting a sample were placed on a measurement surface (light-receiving surface on the upper side shown in the FIG. 205 of a power meter (laser output measuring apparatus) 200 so as to be parallel with each other in plan view, for placing a sample on the block pieces 240 so as to step over the center of the measurement surface 205 and supporting both ends of the sample by the block pieces 240. The distance H1 between the measurement surface 205 and the upper surface of each block piece 240 was adjusted to 15 mm. Then, the sample was temporarily placed on the block pieces, and the position of a laser irradiation head 101 was determined so that the focal point (distance H2) of laser light La was set on the upper surface of the sample. After determination of the position of the laser irradiation head, the sample was temporarily placed on another position. In the presence of the sample, the measurement surface 205 of the power meter 200 was irradiated with the laser light La a plurality of times (e.g., five times) at a specific low output for a short period of time (e.g., 5 W, 5 s), and the average output (A1) of light which did not transmit through the sample was calculated. Preferably, the power meter 200 for output measurement which can display a digit of hundredth or more is employed. Laser output and irradiation time were determined so that a laser irradiated portion was not burned during irradiation of the sample with laser light.

(Measurement)

Subsequently, the samples TP-1 to TP-4 were sequentially placed on the block pieces 240. Each sample was placed thereon so that both ends of the sample were supported, and was irradiated with the laser light La at the same output and irradiation time as those for laser light irradiation in the presence of the sample, to thereby calculate the average output (A2) in a manner similar to that described above. On the basis of the resultant average output (A2) for each of the samples TP-1 to TP-4 and the average output (A1) in the presence of the sample, the laser light transmissibility (T(%)=(A2/A1)×100) of each sample was calculated, and the laser light transmissibility of each portion of the second resin member (lid 21) after welding was determined.

(Result)

As a result, the sample piece TP-1 forming the specific region (broken-line hatched area) L1 was found to have a transmissibility lower by 5 to 10% than that of the sample piece TP-2, TP-3, or TP-4 forming a portion other than the specific region, and the transmissibility of the sample piece TP-1 was found to be as low as before welding. Regarding the transmissibility (as measured along the welding line) of the weld overlap portion 112 of the sample piece TP-1 itself forming the specific region (broken-line hatched area) L1, as in the case of the transmissibility as measured before welding, the transmissibility at the middle position P1 in the region L1 was found to be lowest, and the transmissibility was found to increase therefrom toward the ends S1 and F1 of the specific region L1. In a manner similar to that described above, a sample (i.e., a portion remaining after removal of a welding trace) was prepared, through cutting and polishing (grinding), from the second resin member before welding, and the transmissibility of the sample was measured and calculated as in the case of each of the aforementioned samples TP-1 to TP-4. As a result, the transmissibility of the sample was found to be almost equal to that of each of the samples TP-1 to TP-4 prepared through removal of a melted portion. This indicates that the transmissibility of the second resin member does not change through laser welding.

Second Embodiment

The second embodiment (i.e., a specific embodiment of the present invention) will be described with reference to FIGS. 6 and 7. The second embodiment differs from the first embodiment only in that the specific region L1 forming the low-laser-light-transmissible portion of the second resin member 21 having laser light transmissibility is formed through a technique (including a production method) differing from that employed in the first embodiment. Therefore, the second embodiment will be described by focusing on only the low-transmissible portion of the lid 21 forming the second resin member 21. Thus, components common between the first and second embodiments are denoted by the same reference numerals, and detailed description thereof is omitted (the same shall apply hereinafter).

Figure 6:
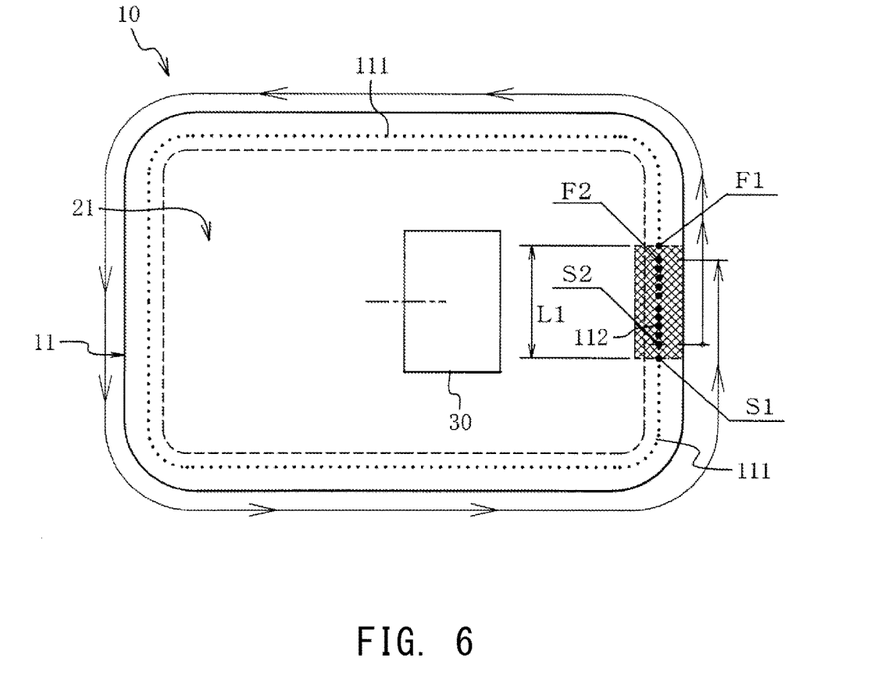
FIG. 6 is a plan view of a low-laser-light-transmissible portion of a second resin member (lid) forming a resin joined body according to another embodiment (second embodiment).
Figure 7:
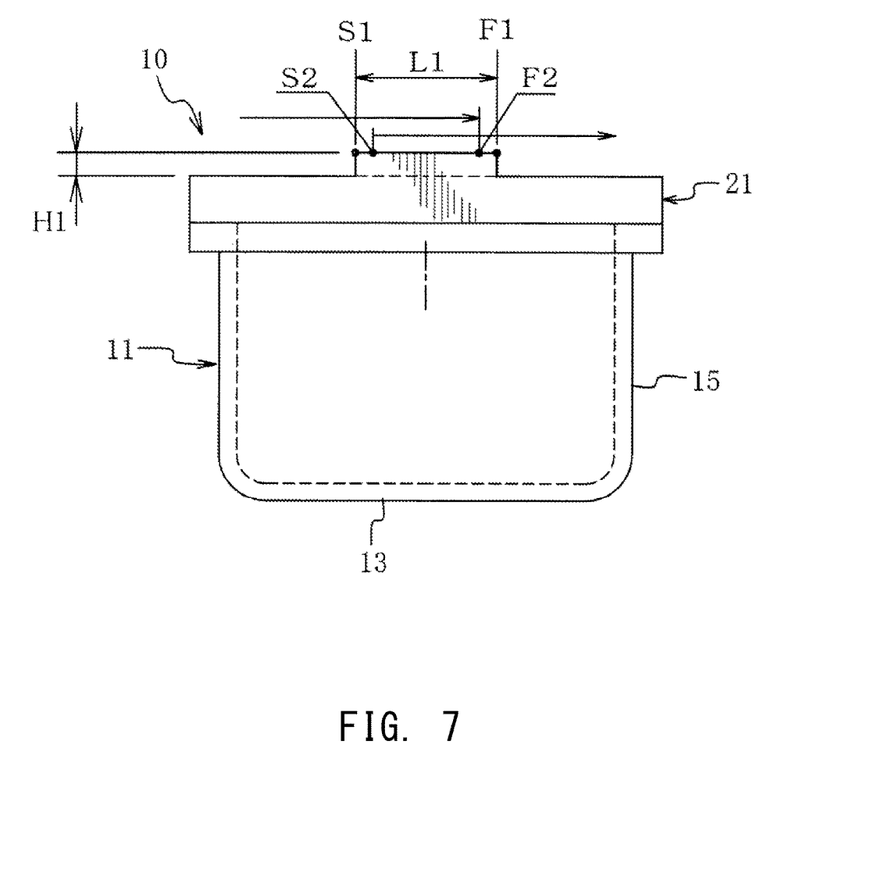
FIG. 7 is an elevational view of the resin joined body (casing) of FIG. 6, as viewed from the right side.

Specifically, in the second embodiment, as shown in FIGS. 6 and 7, the specific region (double-hatched portion in FIG. 6) L1 forming the low-laser-light-transmissible portion of the second resin member 21 (lid 21) is formed so as to be thicker than a region other than the specific region L1; i.e., so as to protrude by a uniform height H1 on the side toward the laser light incident surface. That is, the thickly formed region of the welding portion of the lid 21 corresponds to the low-laser-light-transmissible portion. Specifically, the specific region (region having a specific length) L1 is formed along one short side of the lid 21 so as to have a specific width and to be thicker than another portion, such that the specific region L1 has on the front surface thereof a protrusion having a uniform height H1. The thus-thickened portion corresponding to the specific region L1 exhibits laser light transmissibility lower than that of another portion to a certain extent. Therefore, when, as in the aforementioned embodiment, welding is circumferentially carried out from the point (start point) S2 in the vicinity of one end S1 of the specific region L1, through the start point S2, to the end point F2 in the vicinity of the other end F1, the weld overlap portion 112 is welded so as to be present between the start point S2 and the end point F2 in the specific region L1 forming the low-laser-light-transmissible portion. Although, in the second embodiment, the points S2 and F2 in the vicinity of the ends of the specific region L1 serve as the start point and the end point, respectively, since the specific region L1 exhibits transmissibility lower than another region to a certain extent, the points S1 and F1 at the ends of the specific region L1 should be respectively employed as the start point and the end point, from the viewpoint of design. However, in consideration of errors in positioning, etc., as described above, the points S2 and F2 may be employed as the start point and the end point, respectively. Alternatively, the start point and the end point of the overlap portion 112 may be located outside the specific region L1; i.e., the start point and the end point may be away from the respective ends of the specific region L1, so long as the distance between the start point and the point S1 or between the end point and the point F1 is very small.

In the second embodiment, the low-laser-light-transmissible portion can be formed regardless of the position of a gate of a molding die. Therefore, the second embodiment may be applied to the case where the second resin member 21 is formed of a resin containing reinforcing fiber and has a structure in which a welding portion is separated from a gate of a molding die, or the case where the second resin member is formed of a resin material containing no reinforcing fiber. As in the case of the first embodiment, the height H1 of a protrusion formed in the specific region L1 may be determined in consideration of, for example, the thickness of a welded portion of the second resin member 21 so that favorable bonding strength or sealing performance is achieved in the welded portion through twice-performed welding, and favorable bonding strength or sealing performance is achieved in another welding portion through once-performed welding. In the second embodiment, the thickness of a welding portion of the second resin member 21 (lid 21) is adjusted such that the thickness of the specific region L1 is greater than that of another region. Since the aforementioned protrusion is formed on the front surface of the second resin member, the protrusion does not affect the shape of the bonding surface between the second resin member and the first resin member 11; i.e., the bonding surface can be maintained flat.

For formation of the low-laser-light-transmissible portion in the specific region of the second resin member, a protrusion is not necessarily provided in the specific region as described above, and, for example, the surface (laser light incident surface) of the specific region (double-hatched portion shown in FIG. 6) L1 may be made rougher than the surface of a region other than the specific region L1; i.e., the surface roughness of the specific region L1 may be increased, as compared with another welding portion. Thus, in the second embodiment, effects similar to those obtained in the first embodiment can be achieved, since the surface-roughened specific region exhibits lower laser light transmissibility. The degree of surface roughening on the second resin member may be determined so as to attain an appropriate surface roughness, so that favorable bonding strength or sealing performance is achieved in the weld overlap portion through twice-performed welding, and favorable bonding strength or sealing performance is achieved in another welding portion through once-performed welding.

Thus, in the present invention, the specific region of the welding portion of the second resin member serves as a low-laser-light-transmissible portion which exhibits laser light transmissibility lower than that of a region other than the specific region, and welding is carried out so that the weld overlap portion is present in the specific region forming the low-laser-light-transmissible portion. Therefore, alternative means for forming the low-laser-light-transmissible portion may be formation of a colorant (dye) layer (through application of a colorant (dye)) for inhibiting (suppressing) laser light transmission on the surface (or the interior) of the specific region of the welding portion of the second resin member.

The present invention has been described above by taking the case where welding is carried out once in principle, and welding is carried out twice in the weld overlap portion. However, the present invention is not necessarily limited to such a case, and may be widely applied to a method for producing a resin joined body having a welded portion (corresponding to the weld overlap portion in the present invention) which has been subjected to welding one more time than has another welded portion. That is, so long as a welding portion of the second resin member forming the overlap portion exhibits low laser light transmissibility, even when the overlap portion is subjected to welding one more time than for another portion, the same welding performance can be achieved in these portions. The above-described embodiment corresponds to the case where welding is circumferentially carried out along an endless ring-shaped line by means of a single laser head. However, the present invention may be specifically applied to, for example, the case where a large-sized resin joined body is produced through one-cycle laser welding by moving two laser heads circumferentially (e.g., half cycle by each laser head). In this case, two overlap portions are provided in the resultant resin joined body. The above-described embodiment corresponds to the case where the first resin member of the joined body serves as a casing main body, and the second resin member (serving as a lid) is provided so as to close the opening of the casing main body. However, needless to say, the joined body of the present invention is not limited to such a case. Specifically, the present invention may be applied to various cases, regardless of the structure and shape of the first and second resin members; for example, the invention may be naturally applied to the case where merely flat plates are welded with each other. Meanwhile, the materials employed for the first and second resin members may be appropriately selected, regardless of incorporation of reinforcing fiber, so long as a resin joined body can be produced by bringing the first resin member having laser light absorbability into contact with the second resin member having laser light transmissibility, and irradiating the second resin member with laser light, so as to carry out welding along a line.

DESCRIPTION OF REFERENCE NUMERALS

10: resin joined body
11: first resin member
21: second resin member
101: laser head
111: welded portion
112: weld overlap portion (welded portion between start point and end point)
S2: start point of welding
F2: end point of welding

The invention claimed is:

1. A method for producing a resin joined body, the method comprising bringing a first resin member having laser light absorbability into contact with a second resin member having laser light transmissibility; and irradiating the second resin member with laser light, so as to carry out a cycle of welding along a line to form a welded portion of a resin joined body; and wherein an end point of the cycle of welding lies beyond the start point of the cycle of welding, wherein the welded portion has a weld overlap portion, wherein the weld overlap portion is formed by welding occurring twice along the weld line between the start point of the cycle of welding and the end point of the cycle of welding, the method for producing the resin joined body characterized in that:

prior to irradiating the second resin member with laser light, so as to carry out the cycle of welding, a specific region of the welding portion of the second resin member is formed as a low-laser-light-transmissible portion, the low-laser-light-transmissible portion having laser light transmissibility lower than that of a region of the welding portion other than the specific region; and the first resin member and the second resin member are welded together so that the weld overlap portion overlaps at least a portion of the specific region forming the low-laser-light-transmissible portion.

2. The method for producing the resin joined body according to claim 1, wherein the first resin member and the second resin member are welded together so that the weld overlap portion is present almost entirely within the specific region forming the low-laser-light-transmissible portion.

3. The method for producing the resin joined body according to claim 1, wherein the second resin member contains reinforcing fiber and is formed through injection molding.

4. The method for producing the resin joined body according to claim 1, wherein the specific region forming the low-laser-light-transmissible portion of the second resin member is formed so as to be thicker in a direction toward a laser-light incident surface of the second resin member than a thickness of a region of the welding portion other than the specific region, and to protrude on the laser light incident surface.

5. The method for producing the resin joined body according to claim 1, wherein the specific region forming the low-laser-light-transmissible portion of the second resin member has a laser light incident surface which is rougher than that of a surface of the welding portion other than the specific region.

6. The method for producing the resin joined body according to claim 1, wherein the second resin member has an externally visible positioning mark which is employed when the second resin member is brought into contact with and positioned against the first resin member.

7. A resin joined body produced by bringing a first resin member having laser light absorbability into contact with a second resin member having laser light transmissibility, and irradiating the second resin member with laser light, so as to carry out a cycle of welding along a line to form a welded portion of a resin joined body, wherein an end point of the cycle of welding lies beyond the start point of the cycle of welding, wherein the welded portion has a weld overlap portion, wherein the weld overlap portion is formed by welding occurring twice along the weld line between the start point of the cycle of welding and the end point of the cycle of welding, the resin joined body characterized in that:

prior to irradiating the second resin member with laser light, so as to carry out the cycle of welding, a specific region of a welding portion of the second resin member is formed as a low-laser-light-transmissible portion, the low-laser-light-transmissible portion having laser light transmissibility lower than that of a region of the welding portion other than the specific region; and the weld overlap portion is present in the specific region forming the low-laser-light-transmissible portion.

* * * * *